United States Patent
Alastalo et al.

(10) Patent No.: US 6,552,149 B2
(45) Date of Patent: Apr. 22, 2003

(54) PROPYLENE TERPOLYMERS

(75) Inventors: Kauno Alastalo, Porvoo (FI); Bo Malm, Espoo (FI); Päivi Pitkänen, Halkia (FI); Mika Meller, Oron la Ville (CH); Anne Britt Bjåland, Skien (NO); Nina Ackermans, Tessenderlo (BE); Kshama Motha, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 10/036,728

(22) Filed: Dec. 21, 2001

(65) Prior Publication Data

US 2002/0082376 A1 Jun. 27, 2002

Related U.S. Application Data

(62) Division of application No. 09/446,503, filed as application No. PCT/FI98/00556 on Jun. 24, 1998, now Pat. No. 6,365,682.

(30) Foreign Application Priority Data

Jun. 24, 1997 (FI) .................................................. 972714

(51) Int. Cl.$^7$ ............................................. C08F 210/06
(52) U.S. Cl. ................................ 526/348.6; 526/348.2; 526/348.4; 526/348.5; 526/916; 525/240
(58) Field of Search ........................... 526/348.2, 348.4, 526/348.5, 348.6, 916; 525/240

(56) References Cited

U.S. PATENT DOCUMENTS

| | | | |
|---|---|---|---|
| 4,433,110 A | * | 2/1984 | Baba et al. ............. 526/916 X |
| 5,336,746 A | * | 8/1994 | Tsutsui et al. .......... 526/916 X |
| 5,346,756 A | | 9/1994 | Ogale et al. |
| 5,508,318 A | | 4/1996 | Comer |
| 5,587,229 A | | 12/1996 | Clementini et al. |

FOREIGN PATENT DOCUMENTS

| | | |
|---|---|---|
| EP | 045975 A2 | 2/1982 |
| WO | WO 92/19653 | 11/1992 |

OTHER PUBLICATIONS

Front page of FI 70028 corresponds to EP 0 045 975 A2 (no month, year).
Front page of FI 88047 corresponds to WO 92/19653 (no month, year).

* cited by examiner

Primary Examiner—Fred Teskin
(74) Attorney, Agent, or Firm—Birch, Stewart, Kolasch & Birch, LLP (57) ABSTRACT

A process for producing terpolymers of propylene, comprising a) feeding into a slurry reactor a reaction mixture containing 50–85 w-% of propylene, 1–10 w-% of ethylene, 15–40 w-% of another $C_4$–$C_8$ alpha-olefin, a catalyst system maintaining olefin polymerization at said temperature conditions, and optionally hydrogen, b) polymerizing said reaction mixture at a temperature of lower than 70° C. a sufficient time to obtain a propylene terpolymer amounting to 50–99 w-% of the end product, c) transferring said reaction mixture into a gas phase reactor operating at a pressure of higher than 5 bars, preferably higher than 10 bars, optionally adding 0–30 w-% of ethylene, 0–10 w-% of another $C_4$–$C_8$ alpha-olefin, 0–40 w-% of propylene and optionally hydrogen, and d) continuing polymerization in said gas phase reactor for obtaining a propylene terpolymer amounting to 1–50 wt-% of the end product. The terpolymer has a melting temperature a less than 135° C., preferably less than 132° C., and it can be used for manufacturing films having good sealing properties.

4 Claims, 4 Drawing Sheets

PROPYLENE TERPOLYMERS

This application is a divisional of application Ser. No. 09/446,503, filed on Feb. 22, 2000 now U.S. Pat. No. 6,365,682, and for which priority is claimed under 35 U.S.C. §120. application Ser. No. 09/446,503 is the national phase of POT International Application No. PCT/F198/00556 filed on Jun. 24, 1998 under 35 U.S.C. §371. The entire contents of each of the above-identified applications are hereby incorporated by reference. This application also claims priority of Application No. 972714 filed in Finland on Jun. 24, 1997 under 35 U.S.C. §119.

BACKGROUND OF THE INVENTION

1. Field of the Invention

The present invention relates to the production of propylene polymers. In particular, the present invention concerns film-making terpolymers of propylene and at least two alpha-olefin monomers and a process for producing the polymers. The present terpolymers are suitable, e.g., for applications where good heat sealability and softness are required.

2. Description of Related Art

Polyolefins used in film applications as sealing layers should have low melting temperatures for good heat sealing performance. In polypropylene films, random copolymers having a relatively high content of comonomers, usually ethylene, are commonly used as such a sealing component. A high comonomer content is required for obtaining low melting temperatures. There are, however, problems associated with the production of random copolymers as well as with the end-properties of the material. This is on account of its low melting temperature, broadness of melting range due to poor comonomer distribution, and polymer solubility in the polymerisation medium. By incorporating a third monomer, such as 1-butene or another higher alpha-olefin, the above-mentioned problems can, to some extent, be overcome, and a number of processes for producing terpolymers of propylene are known in the art. However, there are still problems relating to the production of the polymers and to the level of solubles of the products.

In comparison to homopolymer production, when a terpolymer or another high comonomer content polymer having a low melting temperature is to be produced in a slurry reactor, the reaction temperature in that reactor must be lowered because of the high solubles content in the polymer. Further, the comonomers used in the polymerization, such as ethylene and butylene, cause swelling of the polymers in the polymerization medium of the slurry reactor. When swollen and soft polymer particles are flashed after polymerization, the morphology of the particles is destroyed and the bulk density of the powder becomes very low. There is also a higher demand for external heat before it is possible to evaporate unreacted monomer after the slurry reactor. Further, the surface temperature of the flash line must be lowered because of the low melting temperature of the product. Liquid monomer entering the flash together with a sticky polymer will plug the vessel. If pressure in the flash vessel is reduced too much to improve monomer evaporation, flashing takes place too fast and, as mentioned above, the morphology of particles is destroyed causing problems in powder handling.

The above-mentioned problems are aggravated when the proportion of comonomers in the terpolymer increases.

For this reason, in the prior art polymerization of terpolymers having a melting temperature below 132° C. has been carried out by means of gas phase processes.

In EP 0 674 991 a propylene terpolymer is disclosed which comprises 20 to 60 wt-% of a copolymer of propylene and ethylene, containing 1 to 5 wt-% of ethylene, and 40 to 80 wt-% of a copolymer of propylene together with ethylene and a $C_4$–$C_8$ alpha-olefin, the ethylene content being 1 to 5 wt-% and $C_4$–$C_8$ alpha-olefin content being 6 to 15 wt-%. Said product is produced preferably in two gas phase reactors. The $C_4$–$C_8$ alpha-olefin is added in the second gas phase reactor.

U.S. Pat. No. 4,740,551 discloses a process for manufacturing propylene-ethylene impact copolymers. According to this known process, propylene is first homopolymerized in a plug flow pipeline reactor, the polymer is then transferred to a second step, wherein homopolymerization is continued by adding propylene, whereinafter the polymer mixture is transferred to a third gas phase step and polymerization is carried out in the presence of propylene and ethylene for producing said impact copolymers. In the above mentioned patent no other alpha-olefin is used in the third step, which is the only step in which a comonomer other than propylene is used.

SUMMARY OF THE INVENTION

It is an object of the present invention to provide novel materials based on terpolymers, which can be used for manufacturing films having good heat sealing properties.

It is another object of the present invention to provide a process for producing terpolymers of propylene, ethylene and other alpha-olefins in a process comprising in particular slurry and gas phase reactor(s) connected directly together, while avoiding the disadvantages related to operability when producing high comonomer content products.

These and other objects, together with the advantages thereof over known processes and products, which shall become apparent from the specification which follows, are accomplished by the invention as hereinafter described and claimed.

The present invention is based on the finding that the properties of propylene terpolymers can be improved by increasing the amount of heavier comonomers in relation to ethylene. It has further been found that such terpolymers are advantageously produced by means of multi-reactor polymerisation technology. Thus, the invention comprises using a combination of two or more reactors preferably connected in a cascade for producing a mixture of different propylene terpolymer compositions, so as to obtain a polymer product exhiting a ratio of ethylene-to-butylene (or heavier alpha-olefins) of less than 0.3. Such comonomer distribution (randomness) gives a material having low solubles content of preferably less than 6.5% hexane solubles (determined by FDA test), good optical properties and good processibility.

According to the present invention, it is particularly preferred to produce the material in a combination of one or more bulk polymerisation reactor(s) and one or more gas phase reactor(s). Thereby, the comonomer conversion can be increased, operation of the copolymerisation process is facilitated by using the gas phase, and the structure and properties of the resulting product lead to improved heat sealability of articles manufactured from the product.

According to the process as described herein, a process has been designed for producing high comonomer content polymers having a low melting point in at least one slurry reactor in the presence of catalysts at elevated temperature. The process comprises:

a) feeding into a slurry reactor a reaction mixture containing 50 to 85 wt-% of propylene, 1 to 10 wt-% of ethylene, 15 to 40 wt-% of another alpha-olefin, a catalyst system capable of achieving olefin polymerization at said temperature conditions, and optionally hydrogen, b) polymerizing said reaction mixture at a temperature of less than 70° C. for a sufficient time to obtain a propylene terpolymer amounting to 50 to 99 wt-% of the end product, c) transferring said reaction mixture into a gas phase reactor operating at a pressure higher than 5 bar, preferably higher than 10 bar, and optionally adding 0 to 10 wt-% of ethylene, 0 to 10 wt-% of another alpha-olefin, 0 to 40 wt-% of propylene, of said transferred mixture, and optionally hydrogen, and d) continuing polymerization in said gas phase reactor for obtaining a propylene terpolymer amounting to 1 to 50 wt-% of the end product, whereby a terpolymer is obtained having a melting temperature of less than 135° C., preferably less than 132° C.

Thus, according to the present invention, the terpolymerization is carried out in the slurry phase, preferably in a loop reactor by using relatively high amounts of $C_4$–$C_8$ alphaolefins as comonomers. This is possible because the polymer slurry is transferred directly into a gas phase reactor without separating the reaction medium.

According to one embodiment a loop reactor is used as said slurry reactor. According to another embodiment said slurry phase is carried out in two slurry reactors, preferably but not necessarily in two loop reactors. In this way the comonomer distribution can be easily controlled. When continuing the polymerization in a gas phase reactor or reactors, comonomer content can be increased further. Thus, the final polymer properties can be tailored by adjusting comonomer ratios in different reactors.

More specifically, the terpolymer according to the present invention is characterized by what is stated in the characterizing part of claim 1.

The process according to the invention is characterized by what is stated in the characterizing part of claim 5.

Next, the invention will be examined more closely with the aid of a detailed description and with reference to the attached drawings and the following working examples.

DETAILED DESCRIPTION OF THE INVENTION

According to the invention there is provided a propylene terpolymer which is produced in a multistage process for obtaining a high monomer content polypropylene having a low melting point is provided. The comonomers of the terpolymer are selected from the group consisting of alphaolefins, $CH_2$=CHR (R=H or alkyl group).

The polymer produced is a mixture of different polymer compositions. A low melting temperature and a broad melting range are combined with good comonomer distribution. The ratio of the two comonomer components, in particular the ethylene-to-butylene ratio in the terpolymer is lower than in the conventional process. In practical applications, in particular for film production, all these features contribute to give a combination of low xylene and hexane solubles, good stiffness, good optical properties, a broader sealing window, and superior hot tack.

A good combination of sealing properties and hot tack is obtained by a material having so broad melting distribution that a sufficient fraction of polymer melts at the sealing temperature, but still enough material is unmelted to give good hot tack. The fraction melting below 120° C. for material with melting temperature of about 132° C. and fraction melting below 110° C. for material with melting temperature of about 126° C., respectively, indicates the fraction of polymer giving good sealing properties. According to the present invention, the fraction of the polymer product, measured by DSC, melting at the sealing temperature indicated above (120° C. or 110° C., respectively) is greater than 40 wt-%. In particular, for particularly preferred embodiments of the invention comprising a product having a melting temperature of about 132° C., the fraction of product melting at below 120° C. is greater than 50 wt-%.

Compared to a product having the same melting temperature, the present polymers having broader melting distribution (produced in a 2-stage or a multistage process) give better sealing, stiffer material (tensile modulus) and lower hexane solubles according to the FDA test than the one with narrower melting distribution (one-stage process).

Compared to a random copolymer with ethylene as comonomer having the same melting temperature the terpolymers according to this invention give lower amount of hexane solubles. In addition, it should be pointed out that random copolymer materials with ethylene as comonomer having melting temperatures of less than 132° C. are difficult or impossible to produce in a slurry process with Z/N catalysts.

The ratio of ethylene-to-butene (or heavier) of less than 0.3, in particular less than 0.28, gives good comonomer distribution (randomness), which leads to a material having low solubles, good optical properties and good processability, and in addition improved production of terpolymers.

To obtain the material, it is particularly preferred to use a process based on a combination of a first polymerization zone comprising at least one slurry reactor and a second polymerization zone comprising at least one gas phase reactor.

In the first step of the process a polymerization catalyst system and monomer mixture is fed into a slurry reactor. Propylene acts as a monomer and a diluent in the reaction mixture. The $C_4$–$C_8$ alpha-olefin can be 1-butene, 1-pentene, 4-methyl-1-pentene, 1-hexene, 1-heptene or 1-octene. The amount of propylene can be 50 to 85 wt-%, the amount of ethylene can be 1 to 10 wt-% and the amount of other alpha-olefin can be 15 to 40 wt-%. Thus the content of alpha-olefin such as 1-butene is very high. The flashing of the reaction mixture containing polymer particles in an ordinary flash, wherein flashing of monomers takes place in a flashline and polymer powder and gas are separated in flash vessel, would be very difficult. This disadvantage can be avoided according to the invention by flashing directly into a gas phase reactor.

As catalyst any ordinary stereospecific Ziegler-Natta catalysts can be used. An essential component in those catalysts are solid catalyst components comprising a titanium component having at least one titanium-halogen bond, an electron donor compound and a magnesium halide in active form. The catalysts can contain as an internal electron donor compound compounds selected from ethers, ketones, lactones, compounds containing N, P and/or S atoms and esters of mono and dicarboxylic acids.

Polymerization can be carried out in the presence of an organoaluminium compound, such as an aluminium alkyl and an optional external donor compound at temperatures lower than 70° C. and pressures in the range of 30 to 90 bar, preferably 30 to 70 bar. The polymerization is carried out in such conditions that 50 to 99 wt-%, preferably 60 to 90 wt-% of the end product is polymerized in the slurry reactor or reactors. The residence time can be between 15 and 120 min.

Optionally any metallocene catalyst capable of catalyzing the formation of a terpolymer of propylene can be used. A suitable metallocene catalyst comprises a metallocene/activator reaction product impregnated in a porous support at maximum internal pore volume. The catalyst complex comprises a ligand which is typically bridged, and a transition metal of group IVA . . . VIA, and organoaluminium compound. The catalytic metal compound is typically a metal halide.

In the first slurry step a terpolymer is produced, in which the content of ethylene monomer is in the range of 1 to 4 wt-%, preferably less than 3 wt-%. The $C_4$–$C_8$ olefin content in the product will be in the range of 5 to 12 wt-%.

Hydrogen is added, when desired, into the slurry reactor for regulating the molecular weight of polymer, as conventional.

After the polymerization is complete in the slurry reactor, the reaction medium is not separated from the polymer particles in a conventional flash tank. Instead, the whole content of the polymerization medium along with the polymer particles are transferred into a gas phase reactor.

In the gas phase reactor, 1 to 50 wt-%, preferably 1 to 30 wt-% of the final end product is formed. The polymerization can be carried out at a temperature of 60 to 90° C. and at a pressure higher than 5 bar, preferably higher than 10 bar. Propylene and other monomers can be added, but not necessarily, into the gas phase reactor. Thus, 0 to 40 wt-% of propylene and 0 to 30 wt-% of ethylene can be added at this stage. Hydrogen can be added also into the gas phase reactor, when desired.

The liquid medium from the first stage reactor can function as a cooling medium of the fluid bed in the gas phase reactor, when evaporating therein.

With the process according to the invention terpolymers of propylene can be formed, in which the ethylene content is generally 1 to 10 wt-% and the content of other alpha-olefin is 5 to 25 wt-%. These products have low melting point and thus they can be used for applications such as heat-sealable sheets and films, when softness is required. Products having low stiffness can be used in applications like moulded sheets, lids, bottles and fibres. For the preparation of films and similar articles, it is preferred to produce terpolymers containing less than 3 wt-% units (e.g. 0.3 to 3 wt-%) derived from ethylene and less than 15 wt-% (e.g. 1 to 15 wt-%) of the other units of alpha-olefins.

The following non-limiting examples illustrate the present invention:

EXAMPLES

A combination of a loop reactor and a gas phase reactor was used for producing propylene terpolymers for film. The following characterisation methods were used in testing the polymers produced:

Melt flow rates were measures with the load of 2.16 kg and at 230° C. according to ISO 1133.

Comomer contents (ethylene and butene) were measured with Fourier transform infrared specroscopy (FTIR) calibrated with NMR.

Randomness (ethylene distribution) was measured with Fourier transform infrared spectroscopy (FTIR) calibrated with NMR.

Hexane solubles is a measure, determined at 50° C. and 2 h, of the low molecular mass species in the polymer and they were determined according to FDA 21 LFR. Ch. 1(4-1-92 Ed.).

Melting temperature (peak temperature) was measured with differential scanning calorimetry (DSC) by using a temperature increasing rate of 10° C./min, according to ISO/DIS 11 357-3v. Crystallinity, peak width, and fraction melting below a specified seal initiation temperature were also measured by DSC.

Tensile strength (tensile stress at yield) was measured according to ISO 572-2 (cross head speed=50 mm/min).

Tensile modulus was measured according to ISO 572-2 (cross head speed=1 mm/min).

Izod, notched impact strength was measured according to ISO 180/1A.

Film tests were measured from 40 micrometer thin film produced at a cast film line (Collin), melt temperature 27° C. and chill roll temperature 30° C.

Film modulus (1% secant modulus) was measured according to ISO 1184 (ASTM D882) (cross head speed =5 mm/min).

Haze was measured according to ASTM D 1003 and gloss at 60° C. according to ASTM D 523.

Heat sealing properties were measured from 25 micrometer ABA-film (core layer PP homopolymer and as the surface layer the examined heat seal PP terpolymer. Sealing time was 0.1 s and pressure 3 bar. Heat seal strength=pealing of the seal using film strips, broadness 25.41 mm was measured with an Instron universal tester (cross head speed=100 mm/min).

Hot tack is the strength of the seal when still hot, and it is measured as above.

Examples 1 to 4

A combination of a pilot-scale loop reactor and a gas phase reactor was used to produce propylene terpolymers for films. Propylene, ethylene, butene and hydrogen were fed into the loop reactor. The polymerization temperature was 60° C. in both reactors. The pressure in the loop reactor was 35 bar and in the gas phase reactor 15 bar. The catalyst used was a pre-polymerized catalyst prepared according to FI Patents Nos. 70028 and 86472, and the activity of the catalyst was 35 kg PP/g cat h.

The polymer produced along with unreacted monomers was flashed straight into the gas phase reactor and polymerization was completed therein.

Example 5

The polymerization was carried out as in Examples 1 to 4, but the gas phase reactor was operated at the pressure of 5 bar and at the temperature of 60° C.

Example 6

Comparison

The polymerization was carried out as in Examples 1 to 4, but the product from the loop reactor was passed to conventional flash vessel, which was operated at the pressure of 5 bar. No gas phase reactor was used. The polymerization conditions are presented in the following

Examples 7–9 and Comparative Example 10

Polymerization was carried out as in Examples 1–5 by using a wax-prepolymerized catalyst made according to Finnish Patent No. 88047. The polymerization conditions are presented in the following Table 3.

TABLE 1

|  | Example 1 | | Example 2 | | Example 3 | | Example 4 | | Example 5 | | Example 6 Comparison |
| --- | --- | --- | --- | --- | --- | --- | --- | --- | --- | --- | --- |
|  | loop | gas | loop | gas | loop | gas | loop | gas | loop | gas | loop |
| Pressure bar | 35 | 15 | 35 | 15 | 35 | 15 | 35 | 35 | 35 | 5 | 40 |
| Temperature ° C. | 60 | 60 | 60 | 60 | 60 | 60 | 60 | 60 | 60 | 60 | 70 |
| Production rate | 8.0 | 1.0 | 8.0 | 5 | 8.0 | 5 | 6.7 | 5.0 | 8.0 | 0.2 | 7.8 |
| Propyle feed kg/h | 24 | — | 24 | — | 23 | — | 22 | — | 24 | — | 30 |
| Ethylene feed kg/h | 0.27 | 0.15 | 0.27 | 0.2 | 0.25 | 0.2 | 0.21 | 0.17 | 0.27 | — | 0.35 |
| Butene feed kg/h | 5.6 | — | 5.6 | — | 7.3 | — | 8.0 | — | 5.3 | — | 3.9 |
| Residence time min | 150 | 10 | 150 | 120 | 150 | 120 | 150 | 150 | 150 | 2 | 120 |
| Bulk density g/dm$^3$ |  | 0.42 |  | 0.39 |  | 0.4 |  | 0.4 |  | 0.32 | 0.33 |

The product properties of the terpolymer obtained from the gas phase reactor are presented in the following Table 2.

TABLE 2

|  | Example 1 | Example 2 | Example 3 | Example 4 | Example 5 |
| --- | --- | --- | --- | --- | --- |
| MFR (g/10 min) | 6.2 | 5.5 | 4.9 | 5.6 | 5.8 |
| Total ethylene content (w-%) | 2.7 | 4.3 | 3.2 | 2.9 | 2.5 |
| Total butene content (w-%) | 5.9 | 8.0 | 10.3 | 11.7 | 5.2 |
| Melting temperature (° C.) | 131 | 128 | 125 | 124 | 132.5 |
| Izod notched at RT (kJ/m$^2$) | 9.7 | 34.5 | 27 | 12.5 | 5.4 |
| Tensile strength (MPa) | 21.0 | 15.5 | 15.9 | 16.0 | 22.6 |
| Film tests (thickness 40 □m) . . . |  |  |  |  |  |
| 1% secant modulus (MPa) | 310 | 200 | 220 | 250 | 330 |
| Haze (%) | 1.1 | 1.3 | 1.1 | 1.1 | 2.6 |
| Gloss, 60° | 148 | 145 | 149 | 147 | 139 |
| Heat seal strength: Temp./seal strength |  | 120° C./4,9 N |  | 110° C./4,7 N | 120° C./6.2 N |

In the comparative Example 6 the flash line and the flash vessel were plugged very fast and continuous operation was not possible. Flashing in the flash line was too fast because of the high reaction temperature (70° C.). On the other hand, there was not enough heat transformation in the flash line and flash vessel to evaporate all of unreacted monomers.

In Example 5 the operability improved a lot compared to Example 6, but accumulation of amorphous material was still observed in the flash line. Improvement compared to Example 6 was due to lower reaction temperature in the loop reactor (60° C.), which meant less (slower) flashing in the flash line and better heat transformation in the gas phase reactor (due to recycling gas flow) compared to conventional flash.

TABLE 3

|  | Example 7 | | Example 8 | | Example 9 | | Example 10 (Comparison) | |
| --- | --- | --- | --- | --- | --- | --- | --- | --- |
|  | loop | gas | loop | gas | loop | gas | loop | gas |
| Temperature (° C.) | 60 | 65 | 60 | 74 | 60 | 74 | 60 | 60 |
| Pressure (bar) | 40 | 10 | 38 | 15 | 38 | 15 | 34 | 5 |
| Production rate (kg/h) | 10.9 | 0.2 | 11.3 | 2.5 | 11.0 | 8 | 8 | 0.2 |
| Propylene feed (kg/h) | 30 | — | 30 | — | 23 | — | 21 | — |
| Ethylene feed (kg/h) | 0.42 | — | 0.42 | 0.2 | 0.25 | — | 0.29 | — |
| Butene feed (kg/h) | 8.9 | — | 8.5 | — | 7.3 | — | 8.5 | — |
| Residence time min | 114 | 2 | 114 |  | 114 | 120 | 150 | 2 |
| Bulk density (kg/dm$^3$) |  | 0.35 |  | 0.35 |  | 0.35 |  | 0.25 |

The terpolymer obtained had the properties shown in Table 4 below.

TABLE 4

|  | Example 7 | Example 8 | Example 9 | Example 10 (comparison) |
| --- | --- | --- | --- | --- |
| MFR2 (g/10 min) | 5.4 | 4.8 | 4.9 |  |
| Ethylene content (w-% w-w) | 2.4 | 2.5 | 3.5 | 2.5 |
| Butene content (w-w-%) | 8.6 | 10.6 | 12.4 | 8.2 |
| Melt temperature (° C.) | 126.6 | 124 | 120 | 126.2 |
| Tensile strength (MPa) | 20.6 | 18.6 | 14.2 |  |
| Tensile modulus (MPa) | 650 | 540 | 360 |  |
| Izod notched kJ/m$^2$ | 8.3 | 11.2 | 54 |  |
| 1% secant modulus | 310 | 290 | 190 |  |
| Haze (%) | 1.5 | 0.6 | 1.3 |  |
| Gloss, 60 | 146 | 154 | 152 |  |
| Heat seal strength temp./seal strength | 110° C./ 5.2 N | 110° C./ 5.4 N |  |  |

In comparative Example 10 the flashing rate was too fast because of lower pressure in the gas phase reactor (5 bar). The material was inhomogenous due to the plugging and no mechanical tests were performed. In Examples 7–9 the pressure in the gas phase reactor was increased. Flashing rate in the transfer line decreased more and no accumulation of amorphous material was observed. Bulk density of terpolymer was also increased.

Examples 11–13

A combination of a loop reactor/s and a gas phase reactor was used for producing propylene terpolymers for film. Propylene, ethylene, butene and hydrogen were fed into the loop reactor. The process conditions are presented in Table 5. The catalyst used was a prepolymerised catalyst prepared according to FI Patent No. 88047 (EP-B1 591 224), the activity of which was 35 kg/g cat h.

Mechanical and film properties of the materials are presented in Table 6.

Example 14

Comparative

Random copolymer with ethylene as comonomer was produced in a loop reactor using a prepolymerised catalyst prepared according to FI Patent No. 88047. The test results are given in Tables 5 and 6.

Example 15

Comparative

Terpolymer with ethylene and butene as comonomers was produced in a loop reactor using a prepolymerised catalyst prepared according to FI Patent No. 86472. The test results are given in Tables 5 and 6.

TABLE 5

| Example No. | 11 | 12 | 13 | 14 | 15 |
| --- | --- | --- | --- | --- | --- |
| Split, loop/GPR | 82/12 | na | 80/20 |  |  |
| Temperature, ° C. |  |  |  |  |  |
| Loop 1 | 65 | 65 | 60 | 68 | 60 |
| Loop 2 |  | 65 |  |  |  |
| GPR | 75 | 75 | 74 |  |  |
| Pressure, bar |  |  |  |  |  |
| Loop 1 | 33 | 35 | 38,5 | 41 | 34 |
| Loop 2 |  | 35 |  |  |  |
| GPR | 15 | 15 | 15 |  |  |
| Residence time, h |  |  |  |  |  |
| Loop 1 | 1 | 0.7 | 1.3 | 2.2 | 1.5 |
| Loop 2 |  | 0.3 |  |  |  |
| GPR | 0.47 | 0.2 | 2.5 |  |  |

TABLE 6

| Example No. | 11 | 12 | 13 | 14 | 15 |
| --- | --- | --- | --- | --- | --- |
| MFR (pellets), g/10 min | 4.6 | 5.3 | 4.8 | 4.6 | 5.6 |
| Total ethylene, wt-% | 1.9 | 1.7 | 2.5 | 5 | 2.3 |
| Total 1-butylene, wt-% | 7.4 | 6.4 | 10.6 | 0 | 5.7 |
| Ethylene/butylene | 0.26 | 0.26 | 0.24 |  | 0.4 |
| Randomness (ethylene distrib.) | 89 | 96 | 87 | 68 | 83 |
| FDA test, solub. in hexane | 4.1 | 2 | 6.1 | 4.4 | 4.3 |
| Tm of PP, ° C. | 132.5 | 133 | 124 | 135.7 | 132 |
| Crystallinity, % | 32.8 | 33 | 26.8 | 33 | 32 |
| Peak width (melting), ° C. | 17.4 | 24 | 16 | 29 | 13 |
| Fraction melting below 120° C., wt-% | 51.8 | 51 |  | 41.4 | 45 |
| Fraction melting below 110° C., wt-% |  |  | 42 |  |  |

TABLE 6-continued

| Example No. | 11 | 12 | 13 | 14 | 15 |
|---|---|---|---|---|---|
| Tensile Modulus, MPa | 770 | | 540 | 700 | 740 |
| Cast film, 40 μm | | | | | |
| 1% secant modulus, MPa | 390 | 390 | 290 | 300 | 340 |
| Haze, % | | 0.6 | 2.7 | 0.6 | 0.3 | 1.3 |
| Gloss, 60° | | 154 | 145 | 154 | 155 | 148 |

Figure 1:
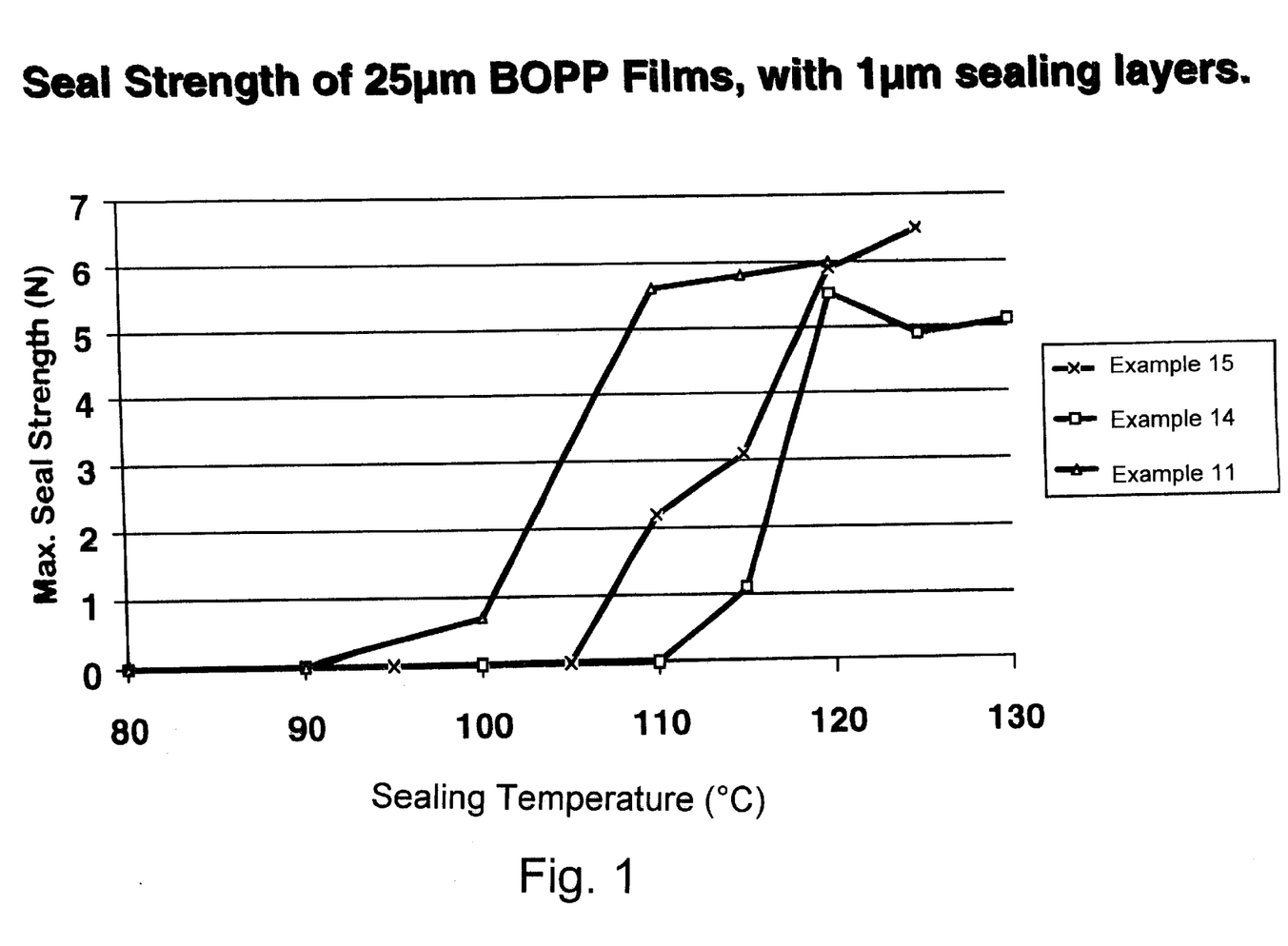
FIG. 1 depicts the seal strength (max. Seal Force, N) of the polymers of Examples 11, 14 and 15 versus sealing temperature.
Figure 2:
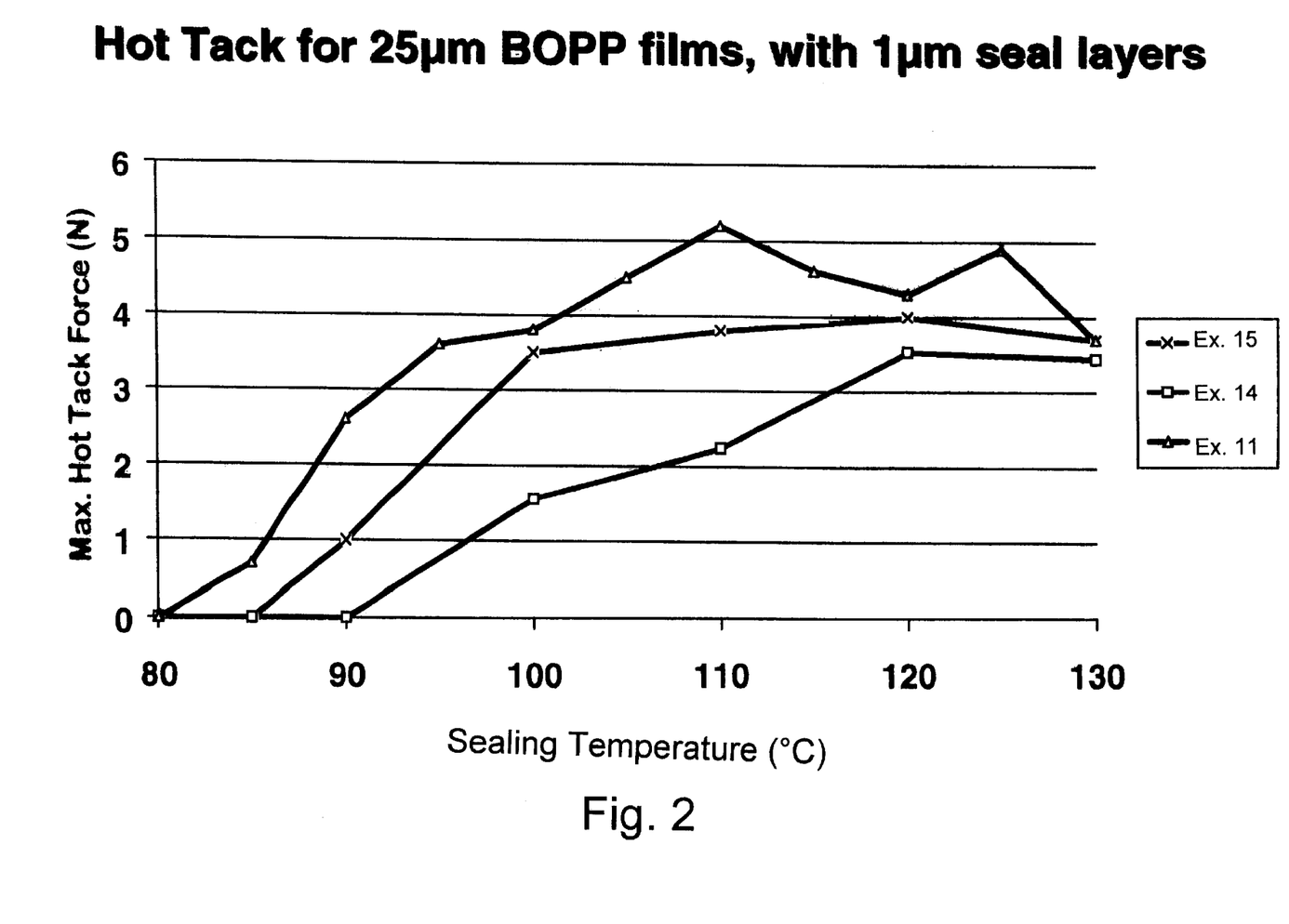
FIG. 2 shows the hot tack performance (max. hot tack force, N) of the same polymers versus sealing temperature.

The heat seal properties (seal strength and hot tack) of films made from the materials according to Examples 11, 14 and 15 are presented in FIGS. 1 and 2.

Figure 3:
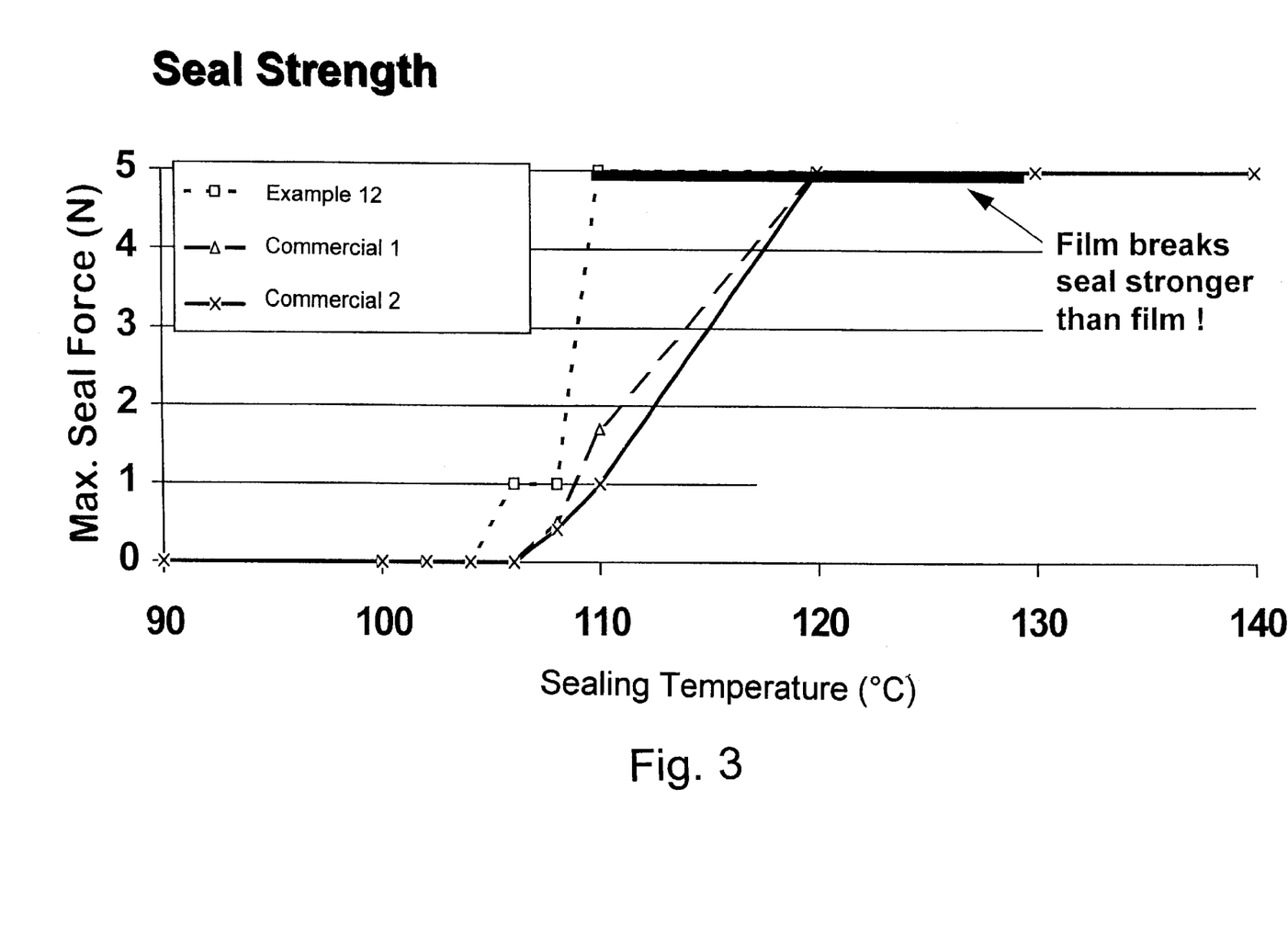
FIG. 3 indicates the seal strength (max. Seal Force, N) versus sealing temperature of the terpolymer according to Example 12 in comparison to two commercial terpolymers.
Figure 4:
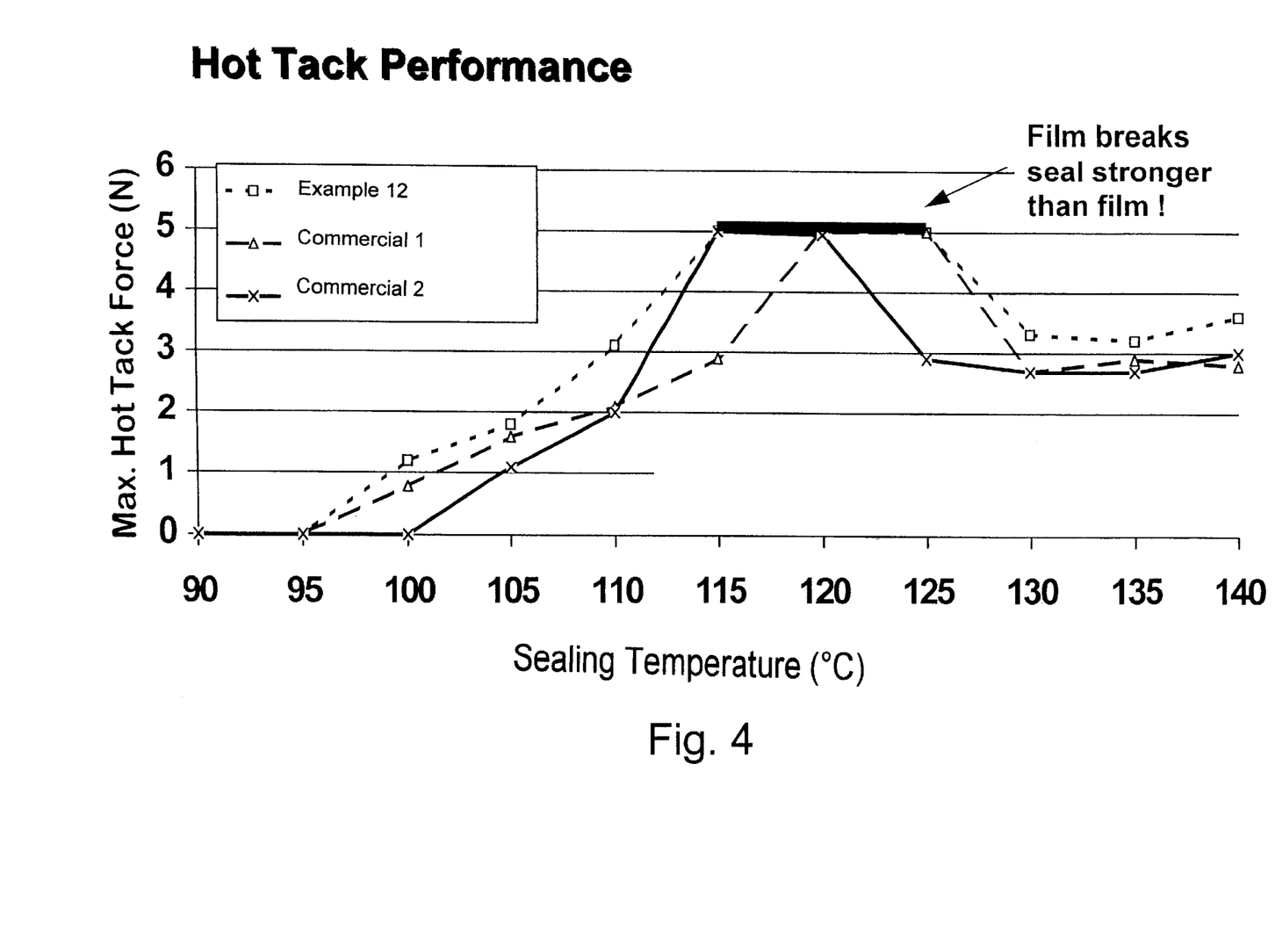
FIG. 4 compares hot tack performance of the same polymers as in FIG. 3.

FIGS. 3 and 4 compare the heat seal properties of films made from the terpolymer of Example 12 and two commercial polymers. The results were determined using a 20 μm BOPP film (1/18(1) with a PP homopolymer in core. Commercial 1 having a Tm of 126.4° C. contains 2.9 wt-% ethylene, 5.9 wt-% 1-butene and has a fraction melting below 110° C. of 34.3%. Commercial 2 having a Tm of 131.6° C. contains 2.3 wt-% ethylene, 4.7 wt-% 1-butene and has a fraction melting below 110° C. of 34.3%

FIGS. 1 and 2 depicting seal strength vs. sealing temperature show that the terpolymer produced in a multi-reactor system has lower seal initiation temperatures than copolymers(s) and terpolymer produced in just one reactor, i.e. the required seal strength is obtained at lower temperatures. In addition, the broader processing window or sealing range as seen in the figures give it a further processing advantage.

Similarly, the figures depicting hot tack vs. sealing temperature show the terpolymer of the invention possessing higher hot tack strength.

As the Data in Table 6 will show, terpolymers produced in multi-reactors have the required combination of properties: low melting temperature, a broad melting peak, and good comonomer distribution, resulting in superior sealing properties, as well as having low hexane and xylene solubles, and good optical properties.

FIGS. 3 and 4 indicate that the present terpolymers have better sealing performance than the commercial polymers tested, which have a higher ethylene-to-butylene ratio.

What is claimed is:

1. A film-making terpolymer of propylene, comprising a mixture of different propylene terpolymer compositions and further comprising comonomer units derived from ethylene and at least one alpha-olefin selected from the group of $C_4$–$C_8$ alpha-olefins, the weight ratio of ethylene to the $C_4$–$C_8$ alpha-olefin(s) being less than 0.3 and the hexane solubles fraction is less than 6.5% calculated from the total weight of the terpolymer.

2. The terpolymer according to claim 1, comprising 0.3 to 3 wt-% units derived from ethylene and 1 to 15 wt-% units derived from at least one $C_4$–$C_8$ alpha-olefin.

3. The terpolymer according to claim 1 or claim 2, having a melting temperature of about 132° C. or 126° C., wherein the fraction of polymer, determined by DSC, melting below 120° C. or 110° C., respectively, is greater than 40 wt-%.

4. The terpolymer according to claim 3, wherein, for a product having a melting temperature of about 132° C., the fraction of product melting at below 120° C. is greater than 50 wt-%.

* * * * *